United States Patent
Zhu et al.

(10) Patent No.: US 11,281,402 B2
(45) Date of Patent: Mar. 22, 2022

(54) MEMORY MANAGEMENT METHOD, MEMORY STORAGE DEVICE AND MEMORY CONTROL CIRCUIT UNIT

(71) Applicant: Hefei Core Storage Electronic Limited, Anhui Province (CN)

(72) Inventors: Qi-Ao Zhu, Anhui Province (CN); Jing Zhang, Anhui Province (CN); Wan-Jun Hong, Anhui Province (CN); Ya-Lin Zhu, Anhui Province (CN); Tong-Jin Liu, Anhui Province (CN)

(73) Assignee: Hefei Core Storage Electronic Limited, Anhui Province (CN)

( * ) Notice: Subject to any disclaimer, the term of this patent is extended or adjusted under 35 U.S.C. 154(b) by 64 days.

(21) Appl. No.: 16/748,814

(22) Filed: Jan. 22, 2020

(65) Prior Publication Data

US 2021/0181981 A1 Jun. 17, 2021

(30) Foreign Application Priority Data

Dec. 13, 2019 (CN) .......................... 201911281211.6

(51) Int. Cl.
*G06F 3/06* (2006.01)

(52) U.S. Cl.
CPC .......... *G06F 3/0659* (2013.01); *G06F 3/0625* (2013.01); *G06F 3/0653* (2013.01); *G06F 3/0679* (2013.01)

(58) Field of Classification Search
CPC .... G06F 3/0659; G06F 3/0653; G06F 3/0679; G06F 3/0616; G06F 3/0625; G06F 3/0658; G06F 1/3275; G06F 1/3206; Y02D 10/00
See application file for complete search history.

(56) References Cited

U.S. PATENT DOCUMENTS

| | | | | |
|---|---|---|---|---|
| 8,438,356 | B2* | 5/2013 | Yoon | G06F 13/1689 711/167 |
| 2015/0006794 | A1* | 1/2015 | Kang | G06F 3/0613 711/103 |
| 2017/0242748 | A1* | 8/2017 | Lin | H03M 13/458 |
| 2019/0095099 | A1* | 3/2019 | Canepa | G06F 3/0659 |
| 2020/0042443 | A1* | 2/2020 | Keung | G06F 3/0613 |
| 2020/0401339 | A1* | 12/2020 | Sun | G06F 3/0653 |

FOREIGN PATENT DOCUMENTS

CN 101908379 6/2015

OTHER PUBLICATIONS

JEDEC, Embedded Multi-Media Card (eMMC) Electrical Standard (5.0), Sep. 2013, JEDEC, Revision JESD84-B50, pp. i-271 (Year: 2013).*
"Office Action of Taiwan Counterpart Application", dated Sep. 23, 2020, p. 1-p. 7.

* cited by examiner

*Primary Examiner* — Reginald G Bragdon
*Assistant Examiner* — Curtis James Kortman
(74) *Attorney, Agent, or Firm* — JCIPRNET

(57) ABSTRACT

A memory management method. The memory management method includes: receiving a command from a host system; sending a command sequence corresponding to the command to a rewritable non-volatile memory module; determining a delay time; and sending a plurality of polling commands to the rewritable non-volatile memory module after the delay time.

15 Claims, 7 Drawing Sheets

MEMORY MANAGEMENT METHOD, MEMORY STORAGE DEVICE AND MEMORY CONTROL CIRCUIT UNIT

CROSS REFERENCE TO RELATED APPLICATION

This application claims the priority benefits of China application serial no. 201911281211.6, filed on Dec. 13, 2019. The entirety of the above-mentioned patent application is hereby incorporated by reference herein and made a part of specification.

BACKGROUND

Technical Field

The present disclosure relates to a memory management technology, and in particular, to a memory management method, a memory storage device, and a memory control circuit unit.

Description of Related Art

Digital cameras, mobile phones and MP3 players have been developed very rapidly over the past few years, leading to a rapid increase in consumer demand for storage media. Since rewritable non-volatile memory module (for example, flash memory) is characterized in data non-volatile, power saving, small size and non-mechanical structure, it is suitable for being embedded in various portable multimedia devices listed above.

In the process of using the memory storage device, the memory storage device will generate heat dissipation. When the temperature reaches a certain level, the system will be in an abnormal working state. Excessive temperature of the memory storage device will affect the performance of the memory storage device and the user experience. Therefore, how to reduce the energy consumption during the operation of the memory storage device is a problem to be solved in the art.

SUMMARY

The disclosure provides a memory management method, a memory storage device and a memory control circuit unit, which can reduce the power consumption of the memory storage device.

An exemplary embodiment of the present disclosure provides a memory management method for a memory storage device including a rewritable non-volatile memory module. The memory management method includes: receiving a command from a host system; transmitting a command sequence corresponding to the command to the rewritable non-volatile memory module; determining a delay time; and transmitting multiple polling commands to the rewritable non-volatile memory module after the delay time has elapsed.

In an exemplary embodiment of the present disclosure, the step of determining the delay time includes: determining the delay time according to the command type of the command, wherein the command includes at least one of a write command, an erase command, or a read command.

In an exemplary embodiment of the present disclosure, the step of determining the delay time according to the command type of the command includes: determining the delay time corresponding to the command type according to a lookup table corresponding to the command type and the delay time.

In an exemplary embodiment of the present disclosure, the step of determining the delay time according to the command type of the command includes: updating the delay time corresponding to the command type according to a busy time during which the command is executed.

In an exemplary embodiment of the present disclosure, the step of updating the delay time corresponding to the command type according to the busy time during which the command is executed includes determining the delay time corresponding to the command type according to the busy time and the preset ratio.

In an exemplary embodiment of the present disclosure, the step of transmitting the polling command to the rewritable non-volatile memory module after the delay time further includes: periodically transmitting the polling command to the rewritable non-volatile memory module in units of a preset time after the delay time has elapsed.

In an exemplary embodiment of the present disclosure, the step of transmitting the polling command to the rewritable non-volatile memory module after the delay time further includes: transmitting the polling command repeatedly until a stopping command is received.

In an exemplary embodiment of the present disclosure, the memory management method further includes: determining that if the temperature of the memory storage device is greater than a threshold value, the polling command is transmitted periodically in units of the preset time after the delay time has elapsed; and determining that if the temperature of the memory storage device is not greater than the threshold value, the polling command is transmitted periodically in units of the preset time.

Another exemplary embodiment of the present disclosure provides a memory storage device, which includes a connection interface unit, a rewritable non-volatile memory module, and a memory control circuit unit. The connection interface unit is coupled to a host system. The memory control circuit unit is coupled to the connection interface unit and the rewritable non-volatile memory module. The memory control circuit unit is configured for receiving commands from the host system, and the memory control circuit unit is further configured to transmit a command sequence corresponding to the command to the rewritable non-volatile memory module. The memory control circuit unit is further configured to determine a delay time, and the memory control circuit unit is further configured to transmit multiple polling commands to the rewritable non-volatile memory module after the delay time has elapsed.

In an exemplary embodiment of the present disclosure, the operation of the memory control circuit unit in determining the delay time includes: determining the delay time according to a command type of the command, wherein the command includes at least one of a write command, an erase command or a read command.

In an exemplary embodiment of the present disclosure, the operation of the memory control circuit unit in determining the delay time according to the command type of the command includes: obtaining a data table corresponding to the command type and the delay time; and determining the delay time corresponding to the command type according to a lookup table corresponding to the command type and the delay time.

In an exemplary embodiment of the present disclosure, the operation of the memory control circuit unit in determining the delay time according to the command type of the command includes: updating the delay time corresponding to the command type according to a busy time during which the command is executed.

In an exemplary embodiment of the present disclosure, the operation of the memory control circuit unit in updating the delay time corresponding to the command type according to the busy time during which the command is executed includes: determining the delay time corresponding to the command type according to the busy time and the preset ratio.

In an exemplary embodiment of the present disclosure, the operation of the memory control circuit unit in transmitting the multiple polling commands to the rewritable non-volatile memory module after the delay time has elapsed includes: periodically transmitting the polling command to the rewritable non-volatile memory module in units of a preset time after the delay time has elapsed.

In an exemplary embodiment of the present disclosure, the operation of the memory control circuit unit in transmitting the multiple polling commands to the rewritable non-volatile memory module after the delay time has elapsed includes: transmitting the polling command repeatedly until a stopping command is received.

In an exemplary embodiment of the present disclosure, the memory control circuit unit is further configured to determine that if the temperature of the memory storage device is greater than a threshold value, the polling command is transmitted periodically in units of the preset time after the delay time has elapsed, and to determine that if the temperature of the memory storage device is not greater than the threshold value, the polling command is transmitted periodically in units of the preset time.

Another exemplary embodiment of the present disclosure provides a memory control circuit unit for controlling a memory storage device including a rewritable non-volatile memory module. The memory control circuit unit includes a host interface, a memory interface, and a memory management circuit. The host interface is coupled to the host system. The memory interface is coupled to the rewritable non-volatile memory module. The memory management circuit is coupled to the host interface and the memory interface. The memory control circuit unit is configured for receiving commands from the host system, and the memory control circuit unit is further configured to transmit a command sequence corresponding to the command to the rewritable non-volatile memory module. The memory control circuit unit is further configured to determine a delay time, and the memory control circuit unit is further configured to transmit multiple polling commands to the rewritable non-volatile memory module after the delay time has elapsed.

In an exemplary embodiment of the present disclosure, the operation of the memory control circuit unit in determining the delay time according to the command type of the command includes: obtaining a data table corresponding to the command type and the delay time; and determining the delay time corresponding to the command type according to a lookup table corresponding to the command type and the delay time.

In an exemplary embodiment of the present disclosure, the operation of the memory control circuit unit in determining the delay time according to the command type of the command includes: updating the delay time corresponding to the command type according to a busy time during which the command is executed.

In an exemplary embodiment of the present disclosure, the operation of the memory control circuit unit in updating the delay time corresponding to the command type according to the busy time during which the command is executed includes: determining the delay time corresponding to the command type according to the busy time and the preset ratio.

In an exemplary embodiment of the present disclosure, the operation of the memory control circuit unit in transmitting the polling command to the rewritable non-volatile memory module after the delay time has elapsed includes: periodically transmitting the polling command to the rewritable non-volatile memory module in units of a preset time after the delay time has elapsed.

In an exemplary embodiment of the present disclosure, the operation of the memory control circuit unit in transmitting the polling command to the rewritable non-volatile memory module after the delay time has elapsed includes: transmitting the polling command repeatedly until a stopping command is received.

In an exemplary embodiment of the present disclosure, the memory control circuit unit is further configured to determine that if the temperature of the memory storage device is greater than a threshold value, the polling command is transmitted periodically in units of the preset time after the delay time has elapsed; and determine that if the temperature of the memory storage device is not greater than the threshold value, the polling command is transmitted periodically in units of the preset time.

Based on the above, the present disclosure determines the polling delay time based on different types of commands so as to start the polling operation when the busy time corresponding to the command is about to end, and further determines whether to delay the polling operation based on the temperature. In this manner, it is possible to reduce the frequency and time of polling the memory status while waiting for the command to complete, thereby reducing the power consumption and heat generation of the memory storage device, thereby reducing the temperature of the memory storage device.

In order to make the aforementioned features and advantages of the disclosure more comprehensible, embodiments accompanying figures are described in detail below.

DESCRIPTION OF THE EMBODIMENTS

A memory storage device (also referred to as a memory storage system) typically includes a rewritable non-volatile memory module and a controller (also referred to as a control circuit unit). The memory storage device is usually used together with a host system, such that the host system is able to write data into or read data from the memory storage device.

Figure 1:
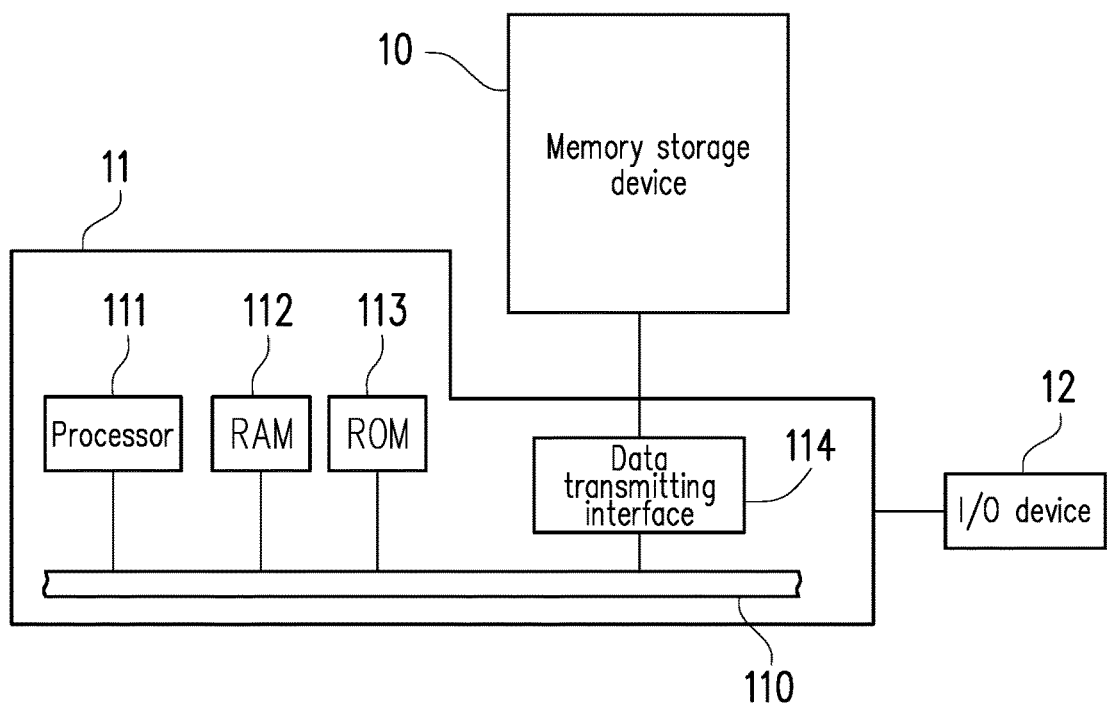
FIG. 1 is a schematic diagram of a host system, a memory storage device, and an input/output (I/O) device according to an exemplary embodiment of the present disclosure.
Figure 2:
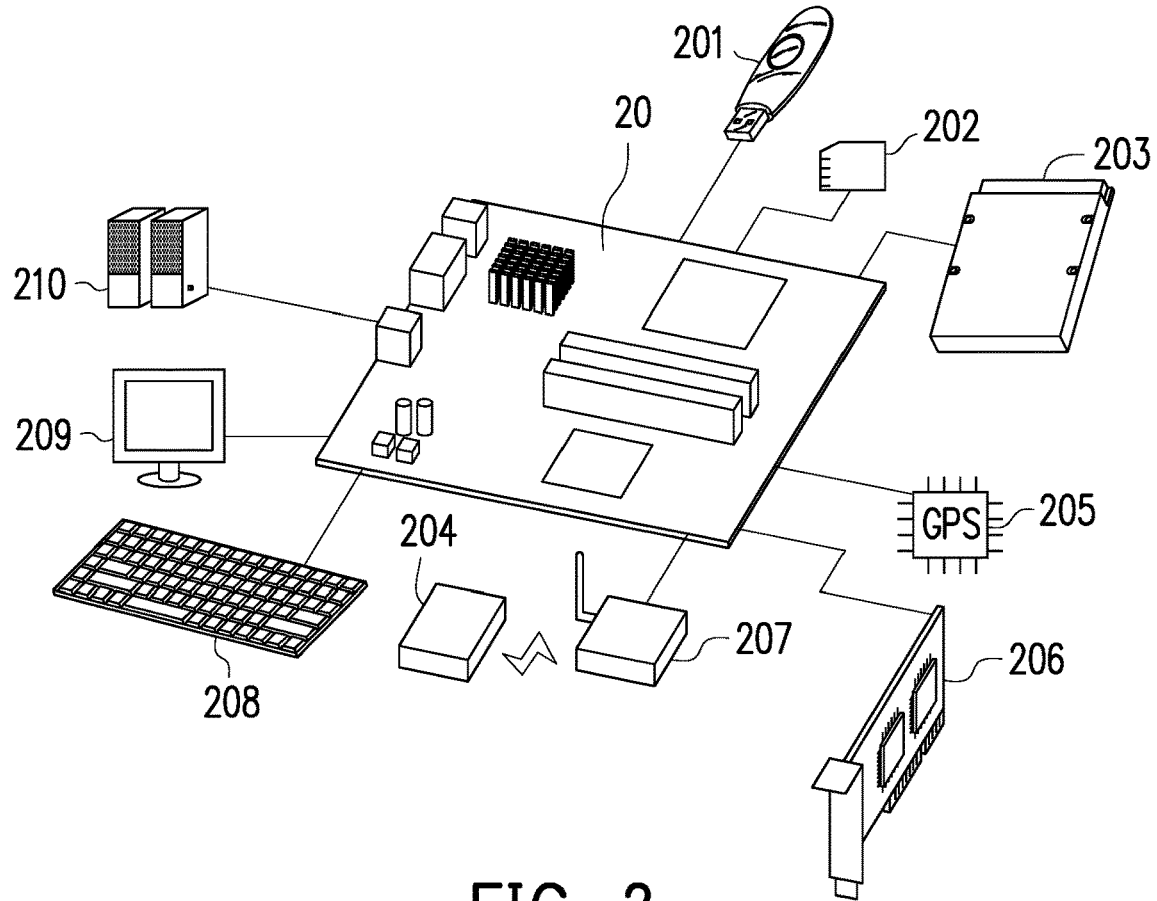
FIG. 2 is a schematic diagram of a host system, a memory storage device, and an I/O device according to another exemplary embodiment of the present disclosure.

FIG. 1 is a schematic diagram illustrating a host system, a memory storage device, and an input/output (I/O) device according to an exemplary embodiment. FIG. 2 is a schematic diagram illustrating a host system, a memory storage device, and an I/O device according to another exemplary embodiment.

With reference to FIG. 1 and FIG. 2, the host system 11 generally includes a processor 111, a random access memory (RAM) 112, a read only memory (ROM) 113, and a data transmission interface 114. The processor 111, the RAM 112, the ROM 113, and the data transmission interface 114 are coupled to a system bus 110.

In an exemplary embodiment, the host system 11 is coupled to the memory storage device 10 through the data transmission interface 114. For instance, the host system 11 writes data into the memory storage device 10 or read data from the memory storage device 10 through the data transmission interface 114. The host system 11 is coupled to the I/O device 12 through the system bus 110. For instance, the host system 11 transmits an output signal to the I/O device 12 or receives an output signal from the I/O device 12 through the system bus 110.

In the present exemplary embodiment, the processor 111, the RAM 112, the ROM 113, and the data transmission interface 114 are configured on a motherboard 20 of the host system 11. The number of the data transmission interface 114 may be one or plural. The motherboard 20 is coupled to the memory storage device 10 in a wireless manner or via a cable through the data transmission interface 114. The memory storage device 10 is, for instance, a flash drive 201, a memory card 202, a solid state drive (SSD) 203 or a wireless memory storage device 204. The wireless memory storage device 204 may be a memory storage device employing various wireless communication techniques, such as a near field communication (NFC) memory storage device, a wireless fidelity (Wi-Fi) memory storage device, a Bluetooth memory storage device, a Bluetooth memory storage device (e.g., an iBeacon) with low power consumption, and so on. The motherboard 20 may also be coupled to a variety of I/O devices, such as a global positioning system (GPS) module 205, a network interface card 206, a wireless transmission apparatus 207, a keyboard 208, a screen 209, and a speaker 210 through the system bus 110. For instance, in an exemplary embodiment, the motherboard 20 may access the wireless memory storage device 204 through the wireless transmission device 207.

Figure 3:
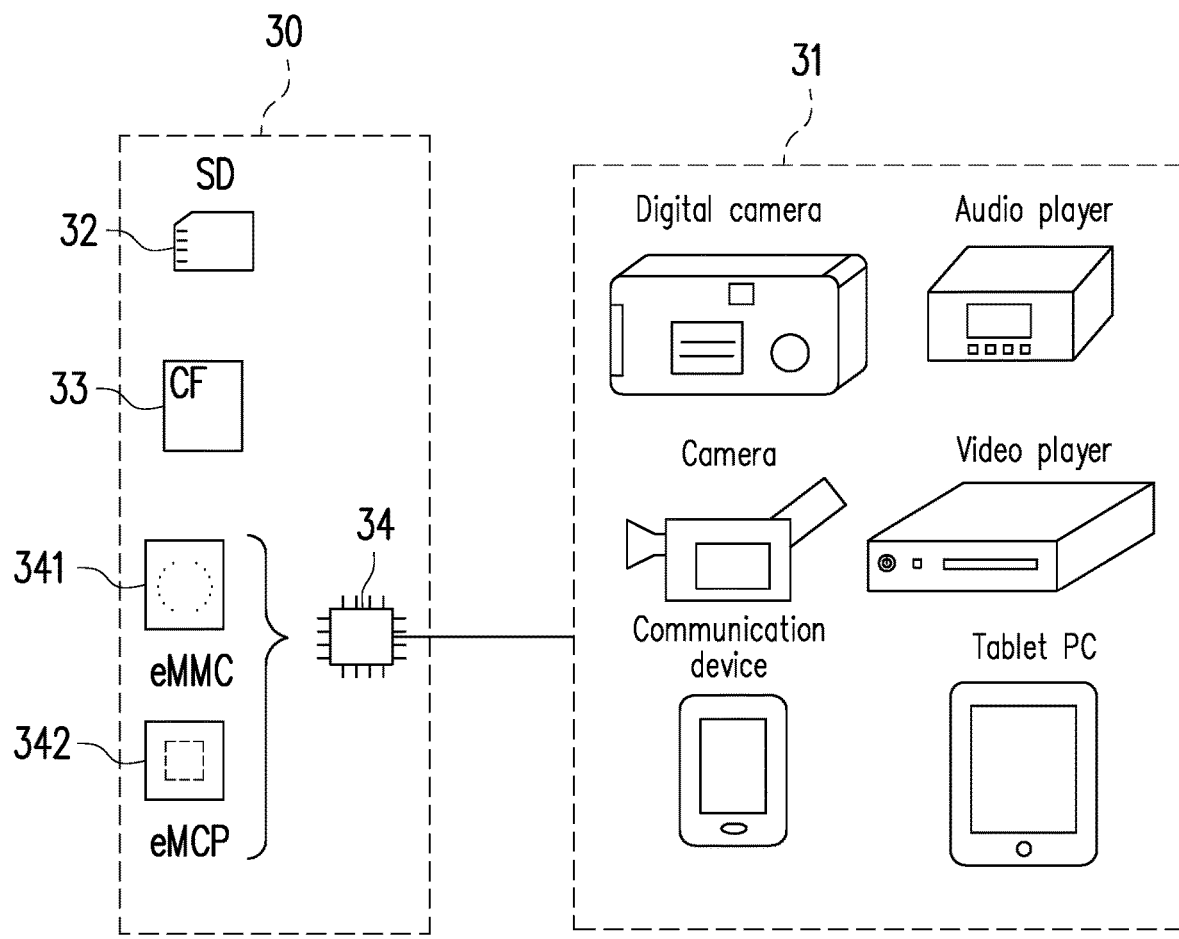
FIG. 3 is a schematic diagram of a host system and a memory storage device according to another exemplary embodiment of the present disclosure.

In an exemplary embodiment, the aforementioned host system may be any system substantially used together with the memory storage device for storing data. In the previous embodiment, the host system is a computer system. By contrast, FIG. 3 is a schematic diagram illustrating a host system and a memory storage device according to another exemplary embodiment the invention. With reference to FIG. 3, in another exemplary embodiment, a host system 31 may also be a digital camera, a camcorder, a communication apparatus, an audio player, a video player, a tablet computer, and so on, while a memory storage device 30 used by the host system 31 may be a non-volatile memory device, such as an secure digital (SD) card 32, a compact flash (CF) card 33, and an embedded storage device 34. The embedded storage device 34 includes an embedded multimedia card (eMMC) 341 and/or an embedded multi-chip package (eMCP) storage device 342, wherein a memory module is directly coupled to a substrate of the host system.

Figure 4:
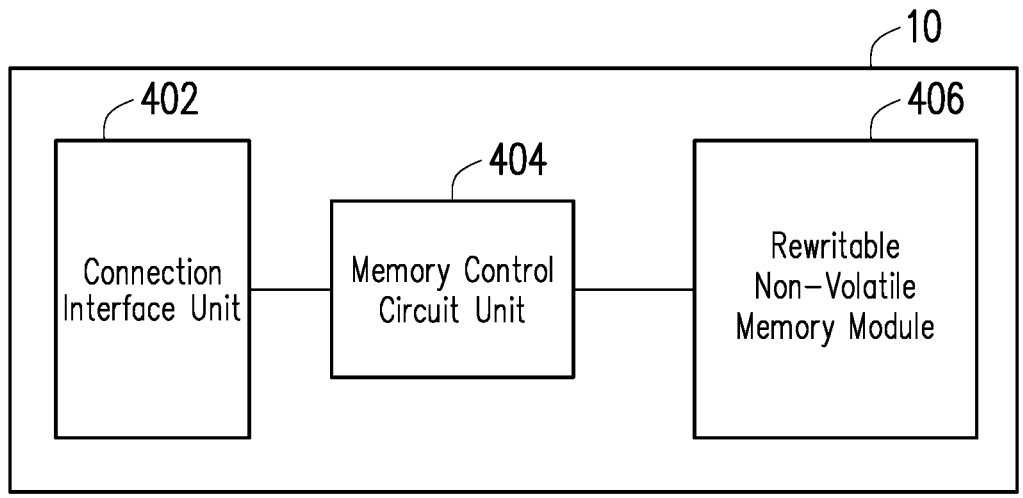
FIG. 4 is a schematic block diagram of a memory storage device according to an exemplary embodiment of the present disclosure.

FIG. 4 is a schematic block diagram of a memory storage device according to an exemplary embodiment of the present disclosure. Please refer to FIG. 4. The memory storage device 10 includes a connection interface unit 402, a memory control circuit unit 404 and a rewritable non-volatile memory module 406.

The connection interface unit 402 is configured for coupling the memory storage device 10 to the host system 11. The memory storage device 10 can communicate with the host system 11 through the connection interface unit 402. In this exemplary embodiment, the connection interface unit 402 is compatible with the Serial Advanced Technology Attachment (SATA) standard. However, it should be understood that the present disclosure is not limited thereto, and the connection interface unit 402 may also comply with the Parallel Advanced Technology Attachment (PATA) standard, Institute of Electrical and Electronic Engineers (IEEE) 1394 standard, Peripheral Component Interconnect Express (PCI Express) standard, Universal Serial Bus (USB) standard, SD interface standard, Ultra High Speed-I (UHS-I) Interface standard, Ultra High Speed-II (UHS-II) interface standard, Memory Stick (MS) interface standard, MCP interface standard, MMC interface standard, eMMC interface standard, Universal Flash Storage (UFS) interface standard, eMCP interface standard, CF interface standard, Integrated Device Electronics (IDE) standard, or other suitable standards. The connection interface unit 402 may be packaged in a chip with the memory control circuit unit 404, or the connection interface unit 402 is arranged outside a chip containing the memory control circuit unit 404.

The memory control circuit unit 404 is configured to execute a plurality of logic gates or control commands implemented in the form of hardware or firmware, and performs data write operation, data read operation, data erase operations and so on in the rewritable non-volatile memory module 406 according to the commands of the host system 11.

The rewritable non-volatile memory module 406 is coupled to the memory control circuit unit 404 and is configured to store the data written by the host system 11. The rewritable non-volatile memory module 406 can be a single level cell (SLC) NAND-type flash memory module (that is, an SLC flash memory module stores 1 bit per cell), Multi Level Cell (MLC) NAND-type flash memory module (i.e., an MLC flash memory module stores 2 bits per cell), Triple Level Cell (TLC) NAND-type flash memory module (i.e., a TLC flash memory module stores 3 bits per cell), a Quad Level Cell (QLC) NAND-type flash memory module (i.e., a QLC flash memory module stores 4 bits per cell), other flash memory modules, or other memory modules with the same characteristics.

Each memory cell in the rewritable non-volatile memory module 406 stores one or more bits based on the change of voltage (hereinafter also referred to as the threshold voltage). Specifically, there is a charge trapping layer between the control gate and the channel of each memory cell. By applying a write voltage to the control gate, the amount of electrons in the charge trapping layer can be changed, thereby changing the threshold voltage of the memory cell. This operation of changing the threshold voltage of the memory cell is also called "writing data to the memory cell" or "programming memory cell". With the change of the threshold voltage, each memory cell in the rewritable non-volatile memory module 406 has multiple storage states. By applying the read voltage, it is possible to determine which storage state that a memory cell belongs to, thereby obtaining one or more bits stored in the memory cell.

In this exemplary embodiment, the memory cells of the rewritable non-volatile memory module 406 may constitute multiple physical programming units, and such physical programming units may constitute multiple physical erase units. Specifically, memory cells on the same word line can form one or more physical programming units. If each memory cell can store2 bits or more, the physical programming units on the same word line can at least be classified into lower physical programming units and upper physical programming units. For example, the least significant bit (LSB) of one memory cell belongs to the lower physical programming unit, and the most significant bit (MSB) of one memory cell belongs to the upper physical programming unit. In general, in the MLC NAND-type flash memory, the writing speed of the lower physical programming unit is faster than the writing speed of the upper physical programming unit, and/or the reliability of the lower physical programming unit is higher than the reliability of the upper physical programming unit.

In this exemplary embodiment, the physical programming unit is the smallest unit of programming operation. That is, the physical programming unit is the smallest unit to write data. For example, the physical programming unit can be a physical page or a sector. If the physical programming unit is a physical page, these physical programming units may include a data bit area and a redundancy bit area. The data bit area contains multiple sectors to store user data, and the redundancy bit area stores system data (for example, management data such as error correction codes). In this exemplary embodiment, the data bit area includes 32 sectors, and the size of one sector is 512 bytes (byte, B). However, in other exemplary embodiments, the data bit area may also include 8, 16 or more or fewer sectors, and the size of each sector may be larger or smaller. On the other hand, the physical erasing unit is the smallest unit of erasing operation. That is, each physical erasing unit contains the smallest number of erased memory cells. For example, the physical erasing unit is a physical block.

Figure 5:
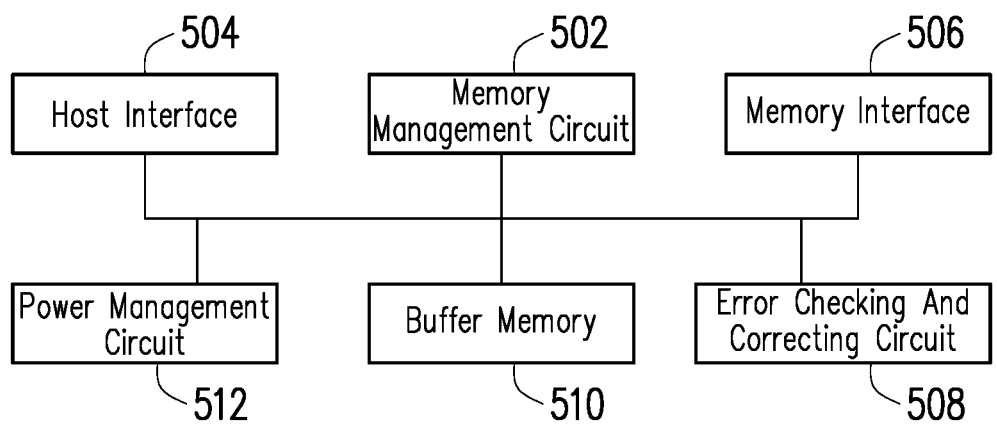
FIG. 5 is a schematic block diagram of a memory control circuit unit according to an exemplary embodiment of the present disclosure.

FIG. 5 is a schematic block diagram of a memory control circuit unit according to an exemplary embodiment of the present disclosure. Please refer to FIG. 5. The memory control circuit unit 404 includes a memory management circuit 502, a host interface 504, and a memory interface 506.

The memory management circuit 502 is configured to control the overall operation of the memory control circuit unit 404. Specifically, the memory management circuit 502 has a plurality of control commands, and when the memory storage device 10 operates, these control commands are executed to perform data writing, reading, and erasing operations. The following description regarding the operation of the memory management circuit 502 is equivalent to the description regarding operation of the memory control circuit unit 404.

In this exemplary embodiment, the control commands of the memory management circuit 502 are implemented in the form of firmware. For example, the memory management circuit 502 has a microprocessor unit (not shown) and a read-only memory (not shown), and these control commands are programmed into the read-only memory. When the memory storage device 10 is operating, these control commands are executed by the microprocessor unit to perform data writing, reading, and erasing operations.

In another exemplary embodiment, the control commands of the memory management circuit 502 may also be stored in a specific area (for example, the system area dedicated to storing system data in the memory module) of the rewritable non-volatile memory module 406 in the form of program code. In addition, the memory management circuit 502 includes a microprocessor unit (not shown), a read-only memory (not shown), and a random access memory (not shown). In particular, the read-only memory has a boot code, and when the memory control circuit unit 404 is enabled, the microprocessor unit first executes the boot code to load the control commands stored in the rewritable non-volatile memory module 406 into the random access memory of the memory management circuit 502. Thereafter, the microprocessor unit will run these control commands to write, read and erase data.

In addition, in another exemplary embodiment, the control command of the memory management circuit 502 may also be implemented in the form of hardware. For example, the memory management circuit 502 includes a microcontroller, a memory cell management circuit, a memory writing circuit, a memory reading circuit, a memory erasing circuit and a data processing circuit. The memory management circuit, the memory writing circuit, the memory reading circuit, the memory erasing circuit and the data processing circuit are coupled to the microcontroller. The memory cell management circuit is configured to manage memory cells or memory cell groups of the rewritable non-volatile memory module 406. The memory writing circuit is configured to issue a write command sequence to the rewritable non-volatile memory module 406 to write data to the rewritable non-volatile memory module 406. The memory read circuit is configured to issue a read command sequence to the rewritable non-volatile memory module 406 to read data from the rewritable non-volatile memory module 406. The memory erasing circuit is configured to issue an erasing command sequence to the rewritable non-volatile memory module 406 to erase data from the rewritable non-volatile memory module 406. The data processing circuit is configured to process the data to be written to the rewritable non-volatile memory module 406 and the data read from the rewritable non-volatile memory module 406. The write command sequence, the read command sequence and the erase command sequence can each include one or more program codes or command codes and configured to instruct the rewritable non-volatile memory module 406 to perform corresponding write, read, and erase operations. In an exemplary embodiment, the memory management circuit 502 may also issue other types of command sequences to the rewritable non-volatile memory module 406 to instruct the rewritable non-volatile memory module 406 to perform corresponding operations.

The host interface 504 is coupled to the memory management circuit 502. The memory management circuit 502 can communicate with the host system 11 through the host interface 504. The host interface 504 can be configured to receive and identify commands and data transmitted by the host system 11. For example, the commands and data transmitted by the host system 11 can be transmitted to the memory management circuit 502 through the host interface 504. In addition, the memory management circuit 502 can transmit data to the host system 11 through the host interface 504. In the exemplary embodiment, the host interface 504 is compatible with the SATA standard. However, it should be understood that the present disclosure is not limited thereto, the host interface 504 may also be compatible with PATA standard, IEEE 1394 standard, PCI Express standard, USB standard, SD standard, UHS-I standard, UHS-II standard, MS standard, MMC standard, eMMC standard, UFS standard, CF standard, IDE standard, or other suitable data transmission standard.

The memory interface 506 is coupled to the memory management circuit 502 and configured to access the rewritable non-volatile memory module 406. In other words, the data to be written to the rewritable non-volatile memory module 406 is converted into the format acceptable by the rewritable non-volatile memory module 406 through the memory interface 506. Specifically, if the memory management circuit 502 wants to access the rewritable non-volatile memory module 406, the memory interface 506 sends a corresponding command sequence. For example, these command sequences may include a write command sequence that instructs to write data, a read command sequence that instructs to read data, an erase command sequence that instructs to erase data, and command sequences configured to instruct various memories to perform corresponding operations (e.g., change read voltage level or perform garbage collection operation, etc.). These command sequences are generated, for example, by the memory management circuit 502 and transmitted to the rewritable non-volatile memory module 406 through the memory interface 506. These command sequences may include one or more signals or data on the bus. These signals or data may include scripts or program code. For example, the read command sequence includes the read identifier, memory address and other information.

In an exemplary embodiment, the memory control circuit unit 404 further includes an error checking and correcting circuit 508, a buffer memory 510, and a power management circuit 512.

The error checking and correcting circuit 508 is coupled to the memory management circuit 502 and is configured to perform error checking and correcting operations to ensure the correctness of the data. Specifically, when the memory management circuit 502 receives a write command from the host system 11, the error checking and correcting circuit 508 generates a corresponding error correcting code (ECC) and/or error detecting code (EDC) for the data corresponding to the write command, and the memory management circuit 502 writes the data corresponding to the write command and the corresponding ECC and/or EDC to the rewritable non-volatile memory module 406. Thereafter, when reading data from the rewritable non-volatile memory module 406, the memory management circuit 502 will simultaneously read the ECC and/or the EDC corresponding to the data, and the error checking and correcting circuit 508 performs error checking and correcting operations on the read data according to the ECC and/or the EDC.

The buffer memory 510 is coupled to the memory management circuit 502 and is configured to temporarily store data and commands from the host system 11 or data from the rewritable non-volatile memory module 406. The power management circuit 512 is coupled to the memory management circuit 502 and is configured to control the power of the memory storage device 10.

In an exemplary embodiment, the rewritable non-volatile memory module 406 of FIG. 4 is also referred to as a flash memory module, and the memory control circuit unit 404 is also known as flash memory controller for controlling the flash memory module. In an exemplary embodiment, the memory management circuit 502 of FIG. 5 is also referred to as a flash memory management circuit.

Figure 6:
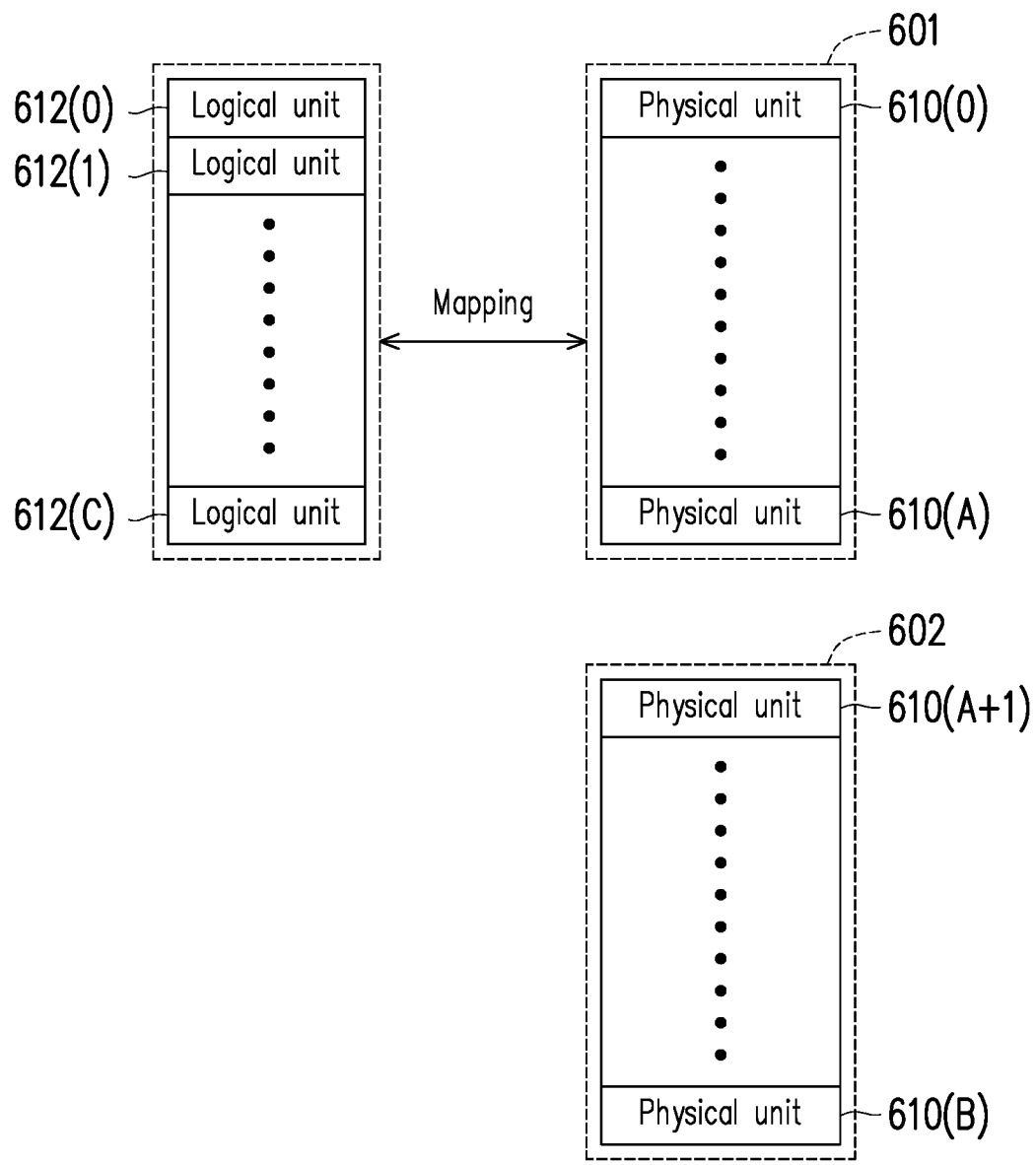
FIG. 6 is a schematic diagram of managing a rewritable non-volatile memory module according to an exemplary embodiment of the present disclosure.

FIG. 6 is a schematic diagram of managing a rewritable non-volatile memory module according to an exemplary embodiment of the present disclosure. Please refer to FIG. 6. The memory management circuit 502 can logically group physical units 610(0) to 610(B) of the rewritable non-volatile memory module 406 into a storage area 601 and a replacement area 602. The physical units 610(0) to 610(A) in the storage area 601 are configured to store data, and the physical units 610(A+1) to 610(B) in the replacement area 602 are configured to replace the damaged physical units in the storage area 601. For example, if the data read from a certain physical unit contains too many errors and cannot be corrected, this physical unit will be regarded as a damaged physical unit. It should be noted that if there is no physical erasing unit available in the replacement area 602, the memory management circuit 502 may declare the entire memory storage device 10 as in the write protect state and can no longer be written with any data.

In the exemplary embodiment, each physical unit refers to a physical erasing unit. However, in another exemplary embodiment, a physical unit may also refer to a physical address, a physical program unit, or a plurality of continuous or discontinuous physical addresses. The memory management circuit 502 configures logic units 612(0) to 612(C) to map the physical units 610(0) to 610(A) in the storage area 601. In the exemplary embodiment, each logical unit refers to a logical address. However, in another exemplary embodiment, a logic unit may also refer to a logic program unit, a logic erase unit, or a plurality of continuous or discontinuous logical addresses. In addition, each of the logical units 612(0) to 612(C) can be mapped to one or more physical units.

The memory management circuit 502 can record the mapping relationship (also known as the logical-physical address mapping relationship) between the logical unit and the physical unit in at least one logical-physical address mapping table. When the host system 11 wants to read data from the memory storage device 10 or write data to the memory storage device 10, the memory management circuit 502 can execute the operation of accessing data on the memory storage device 10 according to the logical-physical address mapping table.

It is noted that in the following description, some terms may be replaced with corresponding abbreviations for ease of reading (see Table 1).

TABLE 1

| rewritable non-volatile memory module | RNVM module |
|---|---|
| MMC | MMC |
| memory storage device | MSD |

Figure 7:
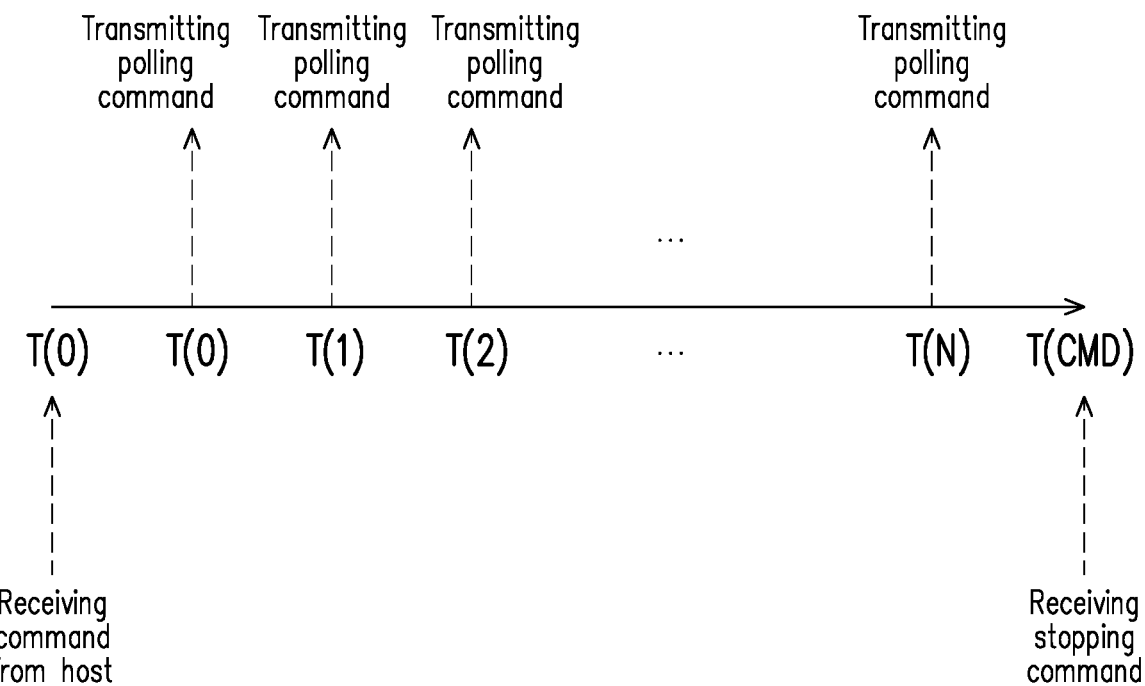
FIG. 7 is a schematic diagram of a conventional transmission of polling command.

FIG. 7 is a schematic diagram of a conventional transmission of polling command. Please refer to FIG. 7. Generally, after receiving a command from the host, the MMC 502 sends a corresponding command sequence to the RNVM module according to the command from the host, and periodically sends a polling command corresponding to the command sequence to the RNVM module 406 in units of a fixed time interval to check the state of the memory. Every time after the MMC 502 completes each polling, the next polling can be started. Therefore, after receiving the host command at the time point T(0), the MMC 502 can send a polling command corresponding to the host command at the time points T(1) to T(N) until the stopping command is received at the time T(CMD) when the command is completed. However, after receiving command from the host, the MMC 502 continuously sends polling commands to read the data in the memory, which will affect the power consumption of the MSD 10.

In an exemplary embodiment of the present disclosure, the MMC 502 receives a command from the host system, and determines the delay time according to the command type of the command. The types of commands are, for example, divided into write commands, erase commands, read commands, or other commands. Then, the MMC 502 sends multiple polling commands to the RNVM module after a delay time has elapsed. Specifically, the MMC 502 may periodically send a plurality of polling commands corresponding to the command sequence to the RNVM module 406 in units of a preset time (i.e., a preset polling time, for example, 0.5 to several microseconds). In addition, the RNVM module 406 can receive a polling command and send a reply message to the MMC 502 in response to the polling command. In an exemplary embodiment, the MMC 502 repeatedly sends a polling command, and the MMC 502 stops sending the polling command until a stopping command is received.

In an exemplary embodiment, the manner in which the MMC 502 determines the delay time is, for example, obtaining the delay time from a lookup table stored in advance. The lookup table stores various command types and delay time corresponding to command types. The MMC 502 can input the command type into the lookup table to find the delay time corresponding to the command type, and determine the time to send the polling command according to the obtained delay time.

In another exemplary embodiment, the delay time is, for example, calculated based on the busy time of the commands of each command type, the present disclosure provides no limitation thereto. The busy time can be obtained through the specifications of the MSD 10 or by measurement. Specifically, the MMC 502 starts to send polling commands to the RNVM module 406 before the busy time is nearly completed. Therefore, the delay time corresponding to the command type can be determined according to the busy time and the preset ratio. Here, the preset ratio is, for example, 95%, 99%, or other ratios, the present disclosure is not limited thereto. In other words, the MMC 502 can calculate the delay time corresponding to the command type to be 95%, 99%, or other percentage of the busy time based on the busy time obtained from the specifications or through measurement. That is, the MMC 502 may, for example, periodically send multiple polling commands in units of a preset time at 1% or 5% of the remaining busy time or other time of the command execution.

In addition, when the MSD 10 is operated, as the capacity of information stored in each memory cell increases, the corresponding busy time will also increase. Therefore, the MMC 502 can also dynamically adjust the delay time corresponding to the command type according to the busy time. The busy time refers to the busy time of executing the commands of each command type. The MMC 502 obtains the busy time of executing the command, and updates the delay time corresponding to the command type according to the busy time of executing the command. In an exemplary embodiment, the MMC 502 determines the delay time corresponding to the command type according to the busy time and a preset ratio. Specifically, it may be that the polling command is sent to the RNVM module 406 before the command is nearly completed. Here, the preset ratio is, for example, 95%, 99%, or other ratios, the present disclosure provides no limitation thereto. In other words, the MMC 502 can determine that the delay time corresponding to the command type is 95%, 99%, or other percentage of the busy time, and periodically send multiple polling commands in units of a preset time at 1% or 5% of the remaining busy time or other time of the command execution.

In another exemplary embodiment, the MMC 502 determines whether to send a polling command after a delay time according to the temperature of the MSD 10. In detail, the MMC 502 obtains the temperature of the MSD 10 and compares the temperature of the MSD 10 with a threshold value (i.e., the temperature threshold value). If the MMC 502 determines that the temperature of the MSD 10 is greater than the temperature threshold value, the MMC 502 will periodically send the polling commands in units of a preset time after a delay time has elapsed. On the other hand, if the MMC 502 determines that the temperature of the MSD 10 is not greater than the temperature threshold value, the MMC 502 will periodically send multiple polling commands directly in units of a preset time. In an exemplary embodiment, for example, a temperature sensor is provided to sense the temperature of the MSD 10.

Figure 8:
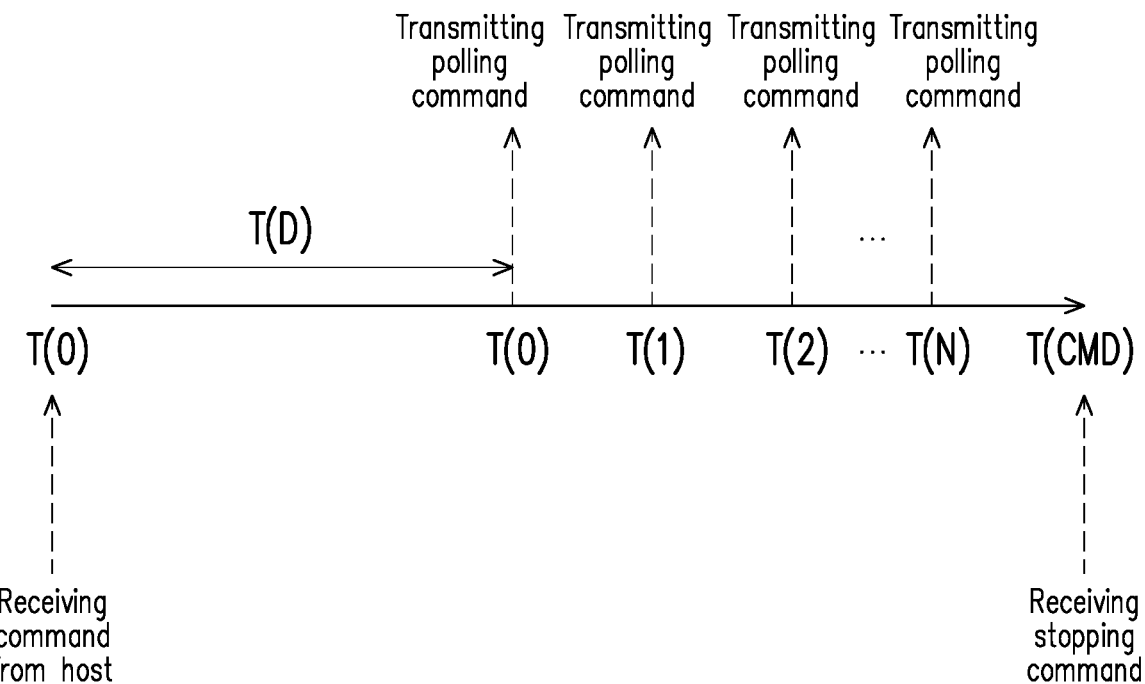
FIG. 8 is a schematic diagram of transmitting a polling command according to an exemplary embodiment of the present disclosure.

FIG. 8 is a schematic diagram of transmitting a polling command according to an exemplary embodiment of the present disclosure. Please refer to FIG. 8. Assume that the MMC 502 receives a host command at time T(0). Therefore, at the time point T(0), the MMC 502 determines the delay time T(D) according to the command type of the received host command. The command type includes write command, erase command, read command or other commands. After the delay time T(D) has elapsed, the MMC 502 can send polling commands to the RNVM module 406 at time points T(1) to T(N), and receive a reply message corresponding to the polling command returned by the RNVM module 406. The MMC 502 will continue to send polling commands until the stopping command corresponding to the host command is received at the time T(CMD) of completion of the command.

Figure 9:
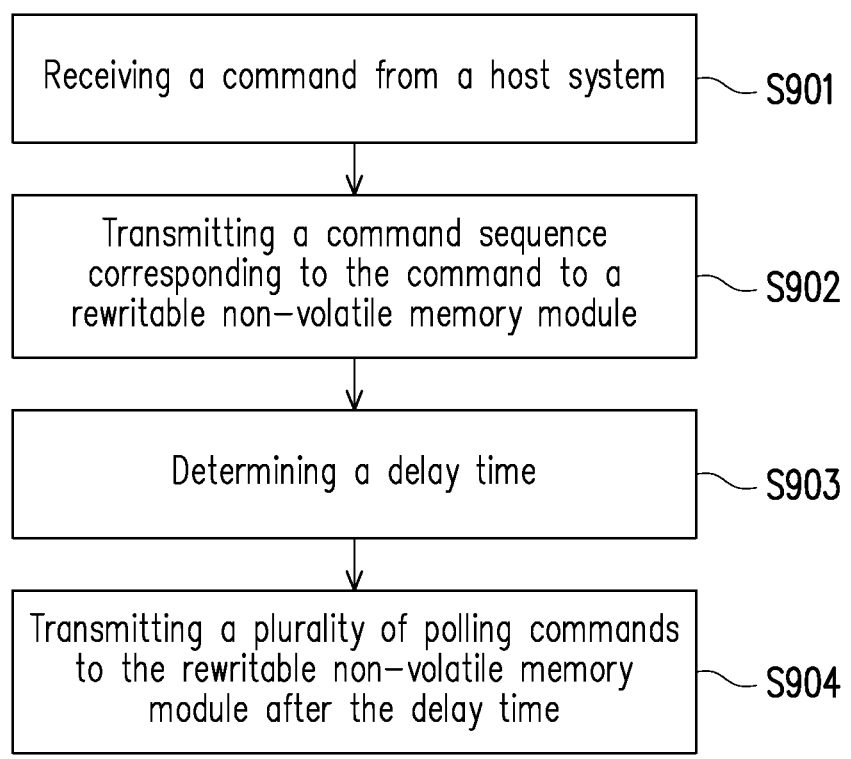
FIG. 9 is a flowchart of a memory management method according to an exemplary embodiment of the present disclosure.

FIG. 9 is a flowchart of a memory management method according to an exemplary embodiment of the present disclosure. Please refer to FIG. 9. In step S901, a command is received from the host system. In step S902, a command sequence corresponding to the command is sent to the RNVM module. In step S903, the delay time is determined. In step S904, multiple polling commands are sent to the RNVM module after the delay time has elapsed.

Figure 10:
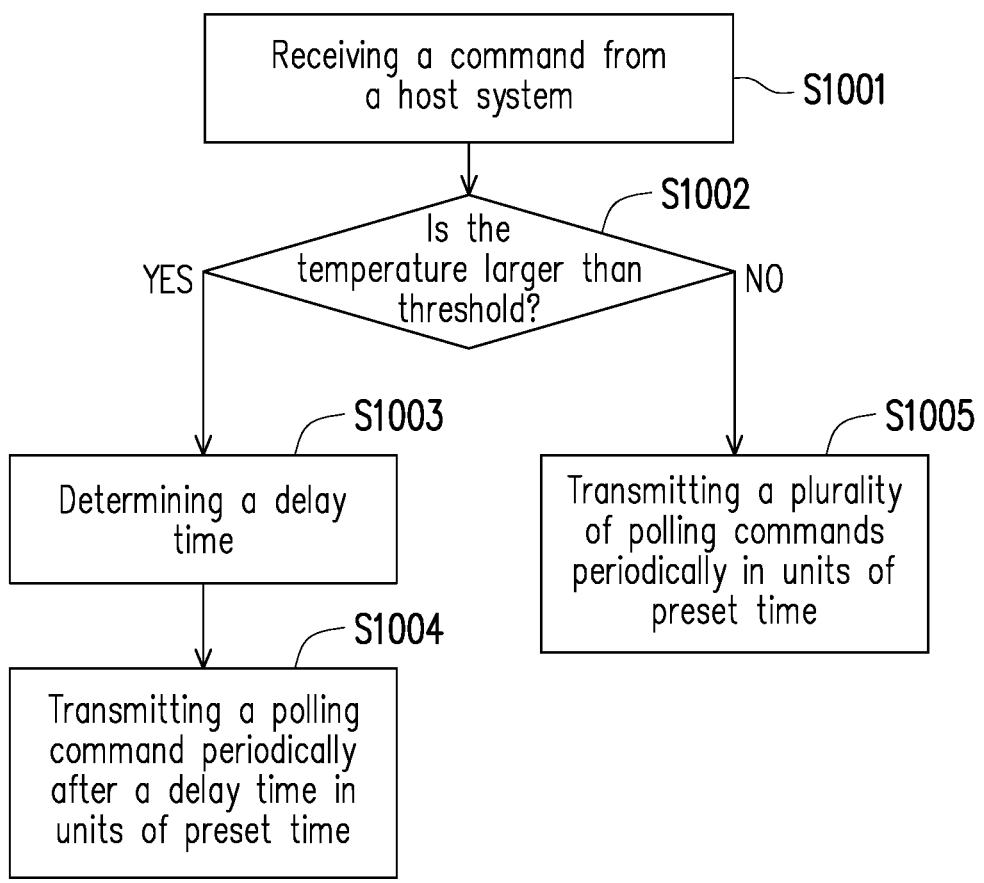
FIG. 10 is a flowchart of a memory management method according to an exemplary embodiment of the present disclosure.

FIG. 10 is a flowchart of a memory management method according to an exemplary embodiment of the present disclosure. Please refer to FIG. 10. In step S1001, a command is received from the host system. In step S1002, it is determined whether the temperature is greater than a threshold value. If it is determined that the temperature is greater than the threshold value (in step S1002, the determining result is YES), then the delay time is determined in step S1003, and a plurality of polling commands are periodically sent in units of a preset time after the delay time has elapsed in step S1004. If it is determined that the temperature is not greater than the threshold value (in step S1002, the determining result is NO), then multiple polling commands are sent periodically in units of a preset time in step S1005.

However, the steps in FIG. 9 and FIG. 10 have been described in detail above, and will not be repeated here. It should be noted that each step in FIG. 9 and FIG. 10 can be implemented as multiple program codes or circuits, the present disclosure provides no limitation thereto. In addition, the method shown in FIG. 9 and FIG. 10 can be used in combination with the above exemplary embodiments, or can be used alone, the present disclosure provides no limitation thereto.

In summary, the present disclosure determines the delay time of the polling operation with respect to the delay time of the command received from the host system, and starts the polling operation when the busy time corresponding to the command is close to the completion of the busy operation. Further, the present disclosure determines whether to delay the polling operation according to the temperature. In this manner, it is possible to reduce the number of times and time of polling the memory status while waiting for the command to complete, thereby reducing the power consumption and heat generation of the MSD, and thus reducing the temperature of the MSD.

What is claimed is:

1. A memory management method for a memory storage device containing a rewritable non-volatile memory module, and the memory management method comprises:
   receiving a command from a host system;
   sending a command sequence corresponding to the command to the rewritable non-volatile memory module;
   determining a delay time according to a command type of the command, comprising:
      multiplying a busy time corresponding to the command type by a preset ratio to obtain the delay time, wherein the preset ratio is less than 1 and greater than or equal to 0.95; and
   detecting whether a temperature of the memory storage device is greater than a threshold value,
   in response to detecting the temperature is greater than the threshold value, sending multiple polling commands periodically in units of a preset time to the rewritable non-volatile memory module after the delay time has elapsed, and
   detecting whether the temperature of the memory storage device is less than or equal to the threshold value,
   in response to detecting the temperature is less than or equal to the threshold value, directly sending the polling command periodically in units of the preset time to the rewritable non-volatile memory module.

2. The memory management method according to claim 1, wherein the command type comprises at least one of a write command type, an erase command type, or a read command type.

3. The memory management method according to claim 1, wherein the step of determining the delay time according to the command type of the command further comprises:
   determining the delay time corresponding to the command type according to a lookup table entry corresponding to the command type, wherein the entry corresponding to the command type contains the delay time.

4. The memory management method according to claim 1, wherein the step of determining the delay time according to the command type of the command further comprises:
   updating the delay time corresponding to the command type according to the busy time, wherein the busy time is a time during which the command is executed.

5. The memory management method according to claim 1, wherein the step of sending the polling commands further comprises:
   sending the polling commands repeatedly until a stopping command is received.

6. A memory storage device, comprising:
   a connection interface unit for coupling to a host system;
   a rewritable non-volatile memory module; and
   a memory control circuit unit coupled to the connection interface unit and the rewritable non-volatile memory module,
   wherein the memory control circuit unit is configured to receive a command from the host system,
   the memory control circuit unit is further configured to send a command sequence corresponding to the command to the rewritable non-volatile memory module,
   the memory control circuit unit is further configured to determine a delay time according to a command type of the command, wherein the memory control circuit unit is further configured to multiply a busy time corresponding to the command type by a preset ratio to obtain the delay time, wherein the preset ratio is less than 1 and greater than or equal to 0.95, and
   the memory control circuit unit is further configured to detect whether a temperature of the memory storage device is greater than a threshold value,
   in response to detecting the temperature is greater than the threshold value, the memory control circuit unit is further configured to send a plurality of polling commands periodically in units of a preset time to the rewritable non-volatile memory module after the delay time has elapsed, and
   the memory control circuit unit is further configured to detect whether the temperature of the memory storage device is less than or equal to the threshold value,
   in response to detecting the temperature is less than or equal to the threshold value, the memory control circuit unit is further configured to directly send the polling command periodically in units of the preset time to the rewritable non-volatile memory module.

7. The memory storage device according to claim 6, wherein the command type comprises at least one of a write command type, an erase command type, or a read command type.

8. The memory storage device according to claim 6, wherein the memory control circuit unit is further configured to determine the delay time corresponding to the command type according to a lookup table entry corresponding to the command type, wherein the entry corresponding to the command type contains the delay time.

9. The memory storage device according to claim 6, wherein the memory control circuit unit is further configured to update the delay time corresponding to the command type according to the busy time, wherein the busy time is a time during which the command is executed.

10. The memory storage device according to claim 6, wherein the memory control circuit unit is further configured to send the polling commands repeatedly until a stopping command is received.

11. A memory control circuit unit for controlling a memory storage device comprising a rewritable non-volatile memory module, and the memory control circuit unit comprises:
    a host interface for coupling to a host system;
    a memory interface for coupling to the rewritable non-volatile memory module; and a memory management circuit coupled to the host interface and the memory interface, wherein the memory control circuit unit is configured to receive a command from the host system, the memory control circuit unit is further configured to send a command sequence corresponding to the command to the rewritable non-volatile memory module, the memory control circuit unit is further configured to determine a delay time according to a command type of the command, wherein the memory control circuit unit is further configured to determine the delay time by multiplying a busy time corresponding to the command type by a preset ratio to obtain the delay time, wherein the preset ratio is less than 1 and greater than or equal to 0.95, and the memory control circuit unit is further configured to detect whether a temperature of the memory storage device is greater than a threshold value, in response to detecting the temperature is greater than the threshold value, the memory control circuit unit is further configured to send a plurality of polling commands periodically in units of a preset time to the rewritable non-volatile memory module after the delay time has elapsed, and the memory control circuit unit is further configured to detect whether the temperature of the memory storage device is less than or equal to the threshold value, in response to detecting the temperature is less than or equal to the threshold value, the memory control circuit unit is further configured to directly send the polling command periodically in units of the preset time to the rewritable non-volatile memory module.

12. The memory control circuit unit according to claim 11, wherein the command type comprises at least one of a write command type, an erase command type, or a read command type.

13. The memory control circuit unit according to claim 11, wherein the memory control circuit unit is further configured to determine the delay time corresponding to the command type according to a lookup table entry corresponding to the command type, wherein the entry corresponding to the command type contains the delay time.

14. The memory control circuit unit according to claim 11, wherein the memory control circuit unit is further configured to update the delay time corresponding to the command type according to the busy time, wherein the busy time is a time during which the command is executed.

15. The memory control circuit unit according to claim 11, wherein the memory control circuit unit is further configured to send the polling commands repeatedly until a stopping command is received.

\* \* \* \* \*